(12) United States Patent
Bliss

(10) Patent No.: US 12,400,444 B2
(45) Date of Patent: Aug. 26, 2025

(54) GENERATING VERIFIABLE AGRICULTURAL DATA

(71) Applicant: Deere & Company, Moline, IL (US)

(72) Inventor: Erica Bliss, Oakland, CA (US)

(73) Assignee: Deere &Company, Moline, IL (US)

( * ) Notice: Subject to any disclaimer, the term of this patent is extended or adjusted under 35 U.S.C. 154(b) by 529 days.

(21) Appl. No.: 17/474,267

(22) Filed: Sep. 14, 2021

(65) Prior Publication Data

US 2023/0084892 A1    Mar. 16, 2023

(51) Int. Cl.
G06V 20/10    (2022.01)
G06N 20/00    (2019.01)
H04L 9/00    (2022.01)
H04L 9/30    (2006.01)
H04L 9/32    (2006.01)

(52) U.S. Cl.
CPC ........... *G06V 20/188* (2022.01); *G06N 20/00* (2019.01); *H04L 9/30* (2013.01); *H04L 9/3236* (2013.01); *H04L 9/50* (2022.05)

(58) Field of Classification Search
None
See application file for complete search history.

(56) References Cited

U.S. PATENT DOCUMENTS 10,242,369 B2 *   3/2019  Klavins .................. G06Q 50/02
2019/0392457 A1 * 12/2019  Kuntagod ........... H04W 12/009
2021/0042582 A1 *  2/2021  Handragal ........... G06V 10/776
2022/0124963 A1 *  4/2022  Taylor .................. A01B 79/005
2023/0306531 A1 *  9/2023  Campbell ............. G06Q 50/02

OTHER PUBLICATIONS

Chun-Ting, Pan, et al. "Agriculture Blockchain Service Platform for Farm-to-Fork Traceability with IoT Sensors." 2020 International Conference on Information Networking (ICOIN), 2020, pp. 158-163. IEEE Xplore, https://doi.org/10.1109/ICOIN48656.2020.9016535. (Year: 2020).*
Al-Najjar, Husam A. H., et al. "Land Cover Classification from Fused DSM and UAV Images Using Convolutional Neural Networks." Remote Sensing, vol. 11, No. 12, Jan. 2019, p. 1461. www.mdpi.com, https://doi.org/10.3390/rs11121461. (Year: 2019).*

(Continued)

*Primary Examiner* — Matthew C Bella
*Assistant Examiner* — Johnny B Duong
(74) *Attorney, Agent, or Firm* — Hanley, Flight & Zimmerman, LLC

(57) ABSTRACT

System and methods for generating a verifiable package of agricultural data to determine whether one or more stewardship criteria have been met. Sensor data from one or more sensors, including at least one vision sensor, can be retrieved with corresponding location data. Agricultural data can be generated that includes the sensor data or inferences determined from the sensor data and the agricultural data can be packaged with authentication data to generate a verifiable package. The authentication data can be utilized to determine the authenticity of the agricultural data and compliance with one or more stewardship criteria can be determined based on the agricultural data.

13 Claims, 4 Drawing Sheets

(56) References Cited

OTHER PUBLICATIONS

Chun-Ting, Pan, et al. "Agriculture Blockchain Service Platform for Farm-to-Fork Traceability with IoT Sensors." 2020 International Conference on Information Networking (ICOIN), 2020, pp. 158-63. IEEE Xplore, https://doi.org/10.1109/ICOIN48656.2020.9016535. (Year: 2020).*

Deines, Jillian M., et al. "Satellites Reveal a Small Positive Yield Effect from Conservation Tillage across the US Corn Belt." Environmental Research Letters, vol. 14, no. 12, Dec. 2019, p. 124038. Institute of Physics, https://doi.org/10.1088/1748-9326/ab503b. (Year: 2019).*

Jiang, Peng, et al. "Real-Time Detection of Apple Leaf Diseases Using Deep Learning Approach Based on Improved Convolutional Neural Networks." IEEE Access, vol. 7, 2019, pp. 59069-59080. IEEE Xplore, https://doi.org/10.1109/ACCESS.2019.2914929. (Year: 2019).*

Zhong, Guoqiang, et al. "Deep Hashing Learning Networks." 2016 International Joint Conference on Neural Networks (IJCNN), 2016, pp. 2236-43. IEEE Xplore, https://doi.org/10.1109/IJCNN.2016.7727476. (Year: 2016).*

Brambilla et al., "Using Blockchain for Peer-to-Peer Proof-of-Location" arXiv:1607.00174v2 [cs.DC]. Dated Jul. 31, 2017. 11 pages.

"Proof of Location" Retreived from https://tokens-economy.gitbook.io/consensus/chain-based-proof-of-capacity-space/dynamic-proof-of-location#:~:text=ProofofLocation. 2 pages.

Shannon Mattern, "A Map That Tracks Everything: Blockchain-based mapping hopes to replace GPS. Can it be trusted?" The Atlantic. Retrieved from https://www.theatlantic.com/technology/archive/2018/11/can-blockchain-maps-replace-gps/576985/. Dated Nov. 30, 2018. 7 pages.

* cited by examiner

GENERATING VERIFIABLE AGRICULTURAL DATA

BACKGROUND

In some instances, an agricultural entity may be entitled to compensation such as incentives based on conditions of agricultural fields. For example, an agricultural entity may be entitled, based on tillage, crop coverage, and/or other farming techniques, to incentives from one or more agencies to induce continued usage of preferred farming techniques. Also, for example, an agricultural field may experience damage due to weather, pests, and/or other detrimental effects, and the agricultural entity may be entitled to compensation in the form of an insurance claim based on the damage.

SUMMARY

Collection of agricultural data to verify eligibility for compensation (incentives or insurance payout) can be challenging. For example, image data can be captured of the agricultural field, but the images must be reviewed and annotated in order to verify the condition of the field. Although the burden of collection of images may be reduced by attaching image sensors to already used farming equipment, the sensors may capture enormous amounts (e.g., terabytes or petabytes) of data, which then must be reviewed. Thus, collection, storage, and review of this image data can be a significant task that consumes computing resources.

Another issue with utilizing image data to verify a condition of an agricultural field is that the images may not necessarily reflect the conditions. For example, captured images may not be of the same field as indicated by an agricultural entity, either purposefully or through error. Further, once captured, the image data and/or other agricultural data may be altered, thus resulting in incorrect analysis by an agency that utilizes the image data for the purposes of determining incentives. Thus, without verification of sensor data, an agency cannot determine, with a high degree of certainty, whether the agricultural field is in the condition indicated by the received image data.

Techniques are described herein for providing agricultural data that is verifiable based on location data indicating where the agricultural data was obtained. For example, various techniques described herein are directed to obtaining agricultural data, generated at least in part by one or more vision sensors that are carried through an agricultural field by agricultural equipment, obtaining location data for the agricultural data, packaging the agricultural data with the location data to generate a verifiable package, and providing the verifiable package to a verification service to verify the authenticity of the agricultural data based on the location data. Techniques described herein generate data that can be utilized to demonstrate compliance and/or crop condition of a field while mitigating tampering with the data that could otherwise result in falsified information.

As an example, an agricultural entity can attach vision sensors and location sensors to farming equipment, such as a tractor that is operating in a field. The sensors can capture images and locations where the images were captured. In some cases, the location sensors and the vision sensors may be integrated into a unitary package, e.g., so that all or at least some images may be geotagged. In some implementations, proof of location technology may be employed to verify that the captured locations (and in some cases, the timestamps associated with them) are accurate and unaltered. Proof of location technology may include, for instance, location-based services (LBS) that utilize digital certificates (or proof of location) to attest to presence at a location at a particular time, multiple devices mutually generating proofs of location wirelessly (e.g., using Bluetooth or Wi-Fi), peer-to-peer (P2P) blockchain, schemes that rely on existing cellular or or Wi-Fi access points, etc.

The resulting images (or a subset of the images, or inference(s) generated from the images) and location data can be packaged with authentication data (e.g., encoded) to generate a package that (e.g., when decoded) allows access to the image data and the locations where the images were captured. Because of the authentication data, the party that receives the package can be certain that the images were captured at the indicated locations. As a result, a verification service can analyze the agricultural data and independently verify the condition of the field that was captured in the images.

In some implementations, the agricultural field where the images were captured can be analyzed to verify one or more agricultural stewardship criteria. For example, images can be analyzed to verify that an agricultural entity is in compliance with acceptable tillage practices, adequate ground cover, organic farming standards, and/or other practices that may be eligible for incentives. Also, for example, images of agricultural fields can be utilized to verify crop damage and/or other factors that may entitle an agricultural entity to payments for lost profits.

In some implementations, the image and location data can be packaged with additional temporal data. For example, in addition to data that indicates a location where images were captured, one or more additional sensors can determine a time when the images were captured. Thus, in addition to verifying the image data based on a location where the images were captured, a verification service can verify the authenticity of the time period in which the images were captured.

In some implementations, in lieu of sending all of the image data, the image data can be sampled and the sampled images can be packaged into a verifiable package. For example, images from image data can be selected based on one or more criteria to reduce the computing requirements for transmitting, verifying, and analyzing the agricultural data. In some implementations, the sampled images can be captured on a periodic basis. In some implementations, images may first be analyzed to infer the content of the images and images may only be included in the agricultural data if doing so improves the verifiability of the field condition. For example, images that are blurry, do not capture the field, and/or otherwise are not necessary in determining a state of the field may be discarded before being bundled into the agricultural data.

In some implementations, one or more machine learning models can be utilized to generate the agricultural data. For example, the image data may be analyzed, e.g., using a machine learning model that has been verified by the verification service, to determine one or more conditions of the field captured in the images. The resulting analysis (e.g., inferences) can then be packaged as the agricultural data and provided to the verification service. In some implementations, the authentication data that is packaged with the agricultural data may be generated by the machine learning model. For example, as output, the machine learning model may be used to generate authentication data (e.g., a digital certificate, a hash, encoded data) that, when utilized, verifies that the corresponding data is accurate and has not been altered.

In some implementations, one or more machine learning models can be utilized to analyze the agricultural data after it has been authenticated. For example, the agricultural data may include image data (as previously described, sampled or selective image data of the agricultural field) and a machine learning model can be utilized to determine, based on the images, a likelihood that one or more conditions exist at the site of the agricultural field. This may include one or more numerical outputs that indicate, for example, a ground cover percentage, the presence of ground cover, a measure of tillage practices, the presence of crop damage, a quantity of crop damage, and/or other factors that can be inferred from the image data.

In some implementations, packaging the agricultural data and location data can include generating a blockchain of the agricultural data. Utilizing a blockchain allows for data to be stored in chronological order such that the timing of the agricultural data can be verified. For example, by utilizing a blockchain, additional images cannot be inserted into the chain of images, images cannot be altered, and/or images cannot be removed from the chain without detection. Verification of the blockchain of images can then be performed.

In some implementations, packaging the agricultural data and location data can include generating an encrypted file using a public key that can be decoded using a private key that is possessed by the verifying party. For example, once the agricultural data has been packaged with the location data, the authentication data can include an encryption of some or all of the packaged data. The encrypted data may then be provided to a verification service that has a key to allow for decrypting of the data. Thus, upon successful decryption, the verified data can be analyzed to determine whether, for example, the originating party is eligible for incentives.

In some implementations, packaging the agricultural data and location data can include generating a hash that is verifiable by the verification service. For example, the authentication data (or output from a machine learning model) can be hashed using the location data. Thus, the hash can be provided with the location data such that the verification service can utilize the hash to determine the authentic agricultural data. In the case that this process does not result in the intended data, the verification service can determine that one or more of the agricultural data and/or the location data has been altered or otherwise compromised.

The above description is provided as an overview of some implementations of the present disclosure. Further description of those implementations, and other implementations, are described in more detail below.

DETAILED DESCRIPTION

Figure 1:
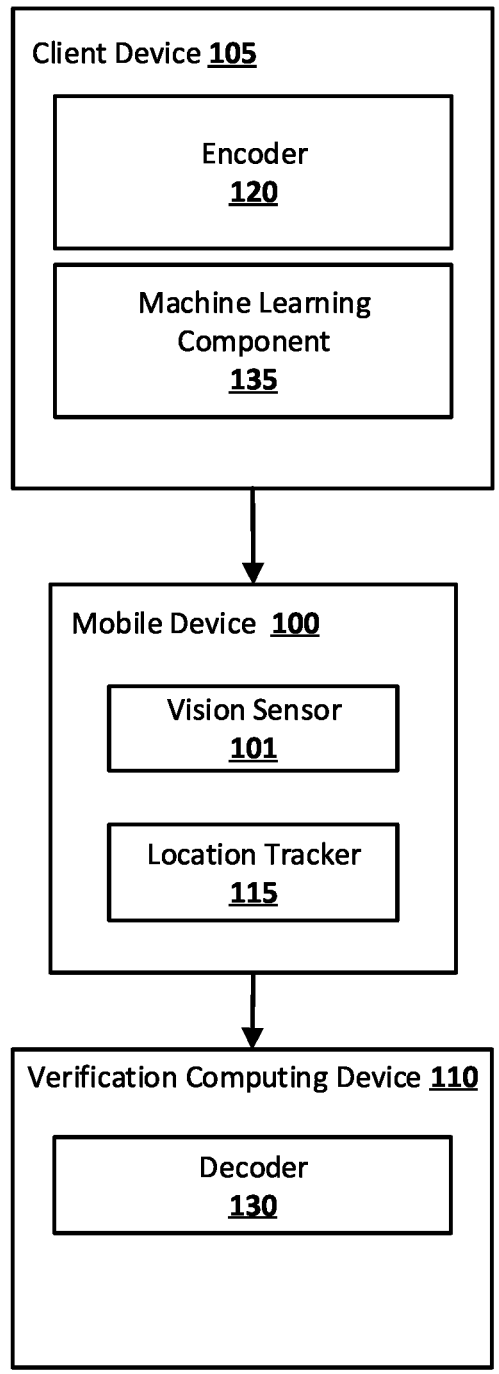
FIG. 1 is an illustration of an example environment in which implementations disclosed herein can be implemented.

Referring to FIG. 1, an illustration of an example environment in which implementations disclosed herein can be implemented is provided. The illustrated environment includes a mobile device 100 that includes a vision sensor 101. The mobile device 100 can be carried through an agricultural field by agricultural equipment, such as a tractor and/or other farm machinery, an agricultural robot, an unmanned aerial vehicle (UAV), agricultural personnel, etc. Further, the illustrated environment includes a client computing device 105 that includes components that are utilized to process the vision data that is generated by the vision sensor 101. In some implementations, the client computing device 105 can be equipped with the vision sensor 101. In some implementations, the client computing device 105 can be a separate device that is in communication with the vision sensor 101. For example, the client computing device 105 can be located remotely from the vision sensor 101 and the vision sensor can provide vision data to the client computing device 105 via one or more communication channels, such as via Wi-Fi and/or other wireless protocols.

In some implementations, the vision sensor 101 can capture images periodically to reduce the volume of data that is being generated and transmitted. For example, the vision sensor 101 can capture an image every second, every minute, and/or other time period. In some implementations, image data that is captured by the vision sensor 101 can be pre-processed before transmitting the image data (or a portion of the image data) to the client computing device 105. For example, quality of images can be downgraded to reduce the size of transmitted image data. Also, for example, images can be filtered to remove images that are similar to other images and/or that do not include additional image information that is required for determining the state of a location. For example, images may first be analyzed to infer the content of the images and images may only be included in the agricultural data if doing so improves the verifiability of the field condition. Images that are blurry, do not capture the field, are duplicative (e.g., no new information is gained that is not already ascertainable from other images), and/or otherwise are not necessary in determining a state of the field may be discarded before being bundled into the agricultural data. In some implementations, captured images can be associated with a timestamp that indicates a time when an image was captured.

The illustrated environment further includes a verification computing device 110. The verification computing device 110 can be located remotely from the client computing device 105 and can communicate with the client computing device 105 via one or more network protocols. For example, the verification computing device 110 can be a cloud-based verification service and the client computing device 105 can transmit, via the Internet, verification data to the verification computing device 110 for further processing. In some implementations, one or more components of the verification computing device 110 can be integrated with the client computing device 105 and/or the mobile device 100.

The mobile device 100 further includes a location tracking component 115 that can determine a geographic location where the mobile device 100 is located. For example, vision sensor 101 can capture images and location tracking component 115 can determine a location (e.g., position coordinates) where each image is captured, such as via GPS and/or other positioning techniques such as wireless triangulation, inertial measurement units (IMU), etc. Thus, for each image that is captured by the vision sensor 101, a location (and additionally, a time) can be associated with the image that indicates a geographic location where the image was captured (i.e., each image can be geotagged).

Client computing device 105 further includes an encoder component 120 that packages image data and location data into an authentication package that, when received by verification computing device 110, can be decoded to result in verifiable data that indicates the location where the encoded images were captured. For example, images and associated location data can be hashed by encoder component 120 such that, when provided to a verification service, the hash can be utilized to verify that the image and location data is accurate and has not been altered between the capture and transmission of the image/location data.

In some implementations, encoder component 120 can generate a blockchain utilizing the image data (and associated location and/or timestamp data). A blockchain can include blocks of data that are sequentially encoded such that, when received, the receiving party can verify that all of the encoded data is present and in order. Thus, as with a hash, the receiving party can be assured that the data, as provided, has not been altered and/or additional data has not been removed from the data stream.

In some implementations, encoder component 120 can further encode the image and location data such that the transmitted data package is not viewable by an entity that does not possess a key to decode the package. For example, encoder component 120 can encrypt the image data package with a public-key to encode the data such that any alterations to the data will result in a package that cannot be decoded. Thus, the verification service, upon receipt of the image data package, can be assured that the data that was transmitted has not been altered and/or tampered with during the capture and transmission process.

Decoder 130 can receive the authentication data from client computing device 110 and determine the authenticity of data. For example, in some implementations, the authentication data can include a hash, and decoder 130 can verify that the image data, with associated location and/or timestamp data, is accurate and has not been altered. In some implementations, wherein the data is sent via a blockchain, the blocks of the blockchain can be utilized, similar to a hash, to verify that the image data and associated location data are accurate and unaltered. In some implementations in which the package is encrypted with a public key, decoder 130 may decrypt it with a private key.

In some implementations, in lieu of sending image data with location and/or timestamp data, machine learning component 135 can analyze the image data to generate agricultural data. For example, machine learning component 135 can utilize one or more machine learning models to determine the condition of crops that are illustrated in images. For example, machine learning component 135 can utilize a machine learning model that has been provided by and/or approved by a verification service to generate, based on the image data, one or more inferences that can either be compared to, or directly indicate compliance with, stewardship criteria and/or purported conditions of crops. In some implementations, a machine learning model that has been previously approved by a verification service, and that has been used to generate inferences about compliance with stewardship or other criteria, may be provided to the verification service. The verification service can verify the authenticity of the model, e.g., by generating a hash of the model and/or the inferences/data generated therefrom. In some implementations, the previously-verified machine learning model may itself be encoded (e.g., by encoder 120) into the agricultural data that is sent to the verification service. The verification service may then verify the authenticity of the data on this basis.

Stewardship criteria can include, for example, tillage practices, type of ground cover in fields, amount of ground cover in fields, and/or other practices that can be employed to demonstrate farming practices that are being encouraged (or discouraged) in the agricultural industry. As one non-limiting example, lodged weeds may be evidence of the application of herbicide, which is not permitted in organic farming. Conditions of crops can include, for example, damage to crops by flooding, fire, pests, drought, and/or other circumstances that are demonstrable by images of fields.

In some implementations, machine learning component 135 can receive, as input, image data and provide, as output, one or more signals that indicate a particular characteristic that is determined from the images. For example, machine learning component 135 can receive an image, utilize a machine learning model such trained to identify crop damage, and provide a numerical result that can be utilized to assess the amount and/or presence of crop damage (e.g., a value between 1 and 100 indicating a likelihood that crop damage is present). Such a machine learning model may take various forms, such as a convolutional neural network (CNN), support vector machine, random forest, etc. In some implementations, machine learning component 135 can utilize multiple machine learning models to determine multiple characteristics of a field. For example, a first machine learning model can be utilized to determine a likelihood and/or detect presence of tillage practices and a second machine learning model can be utilized to determine a likelihood and/or detect the presence of crop damage.

In some implementations, in lieu of transmitting image and location information as agricultural data, client computing device 105 can provide output from machine learning component 135. For example, encoder component 120 can encode (e.g., via hash, blockchain, and/or public key) output from machine learning component 135 and provide the resulting authentication data to decoder 130 for verification. Thus, instead of providing image data, which can be computationally intensive to transmit, client computing device 105 can transmit numerical information that can be analyzed to determine likely damage and/or stewardship practices. In some implementations, where machine learning component 135 determines a likelihood of the presence of one or more conditions, encoder component 120 may encode images along with the machine learning model output that, once transmitted to the verification service and decoded, can be further inspected. For example, if a machine learning model determines, with 50% likelihood, that one or more images includes images of crop damage, the resulting agricultural data may include both the output from the machine learning model and one or more of the images that were utilized as input to the model. Thus, images may be selectively transmitted as agricultural data based on a likelihood that the transmitted images include images of one or more conditions. The transmitted images can then be further analyzed, such as by inspection by a human and/or utilizing one or more additional models. In some implementations, the agricultural data can include images and one or more components can analyze the images after the images have been transmitted (e.g., machine learning component 135 of the verification computing device 110).

In some implementations, the authentication data is packaged to generate a verifiable package that can be provided to the verification computing device 110 for verification. Once verified, the image and location data can be further analyzed to determine whether one or more stewardship criteria have been met and/or to determine a condition of crops in the images. In some implementations, one or more machine learning models can be utilized to further analyze the agricultural data that is included in the verifiable package. For example, one or more machine models can be trained to classify images as depicting crop damage likely caused by specific events, types of tillage practices, types of ground cover (as a total amount or percentage of crops depicted). These classifications or any other inferences drawn using the machine learning model(s) may be compared to, or even be directly indicative of compliance with, stewardship criteria and/or purported crop conditions. In some implementations, one or more components can identify images that are likely to include depictions of one or more conditions and the images can be further inspected to verify that the image(s) are representative of the presence of the conditions (and hence, satisfy some criteria).

Figure 2:
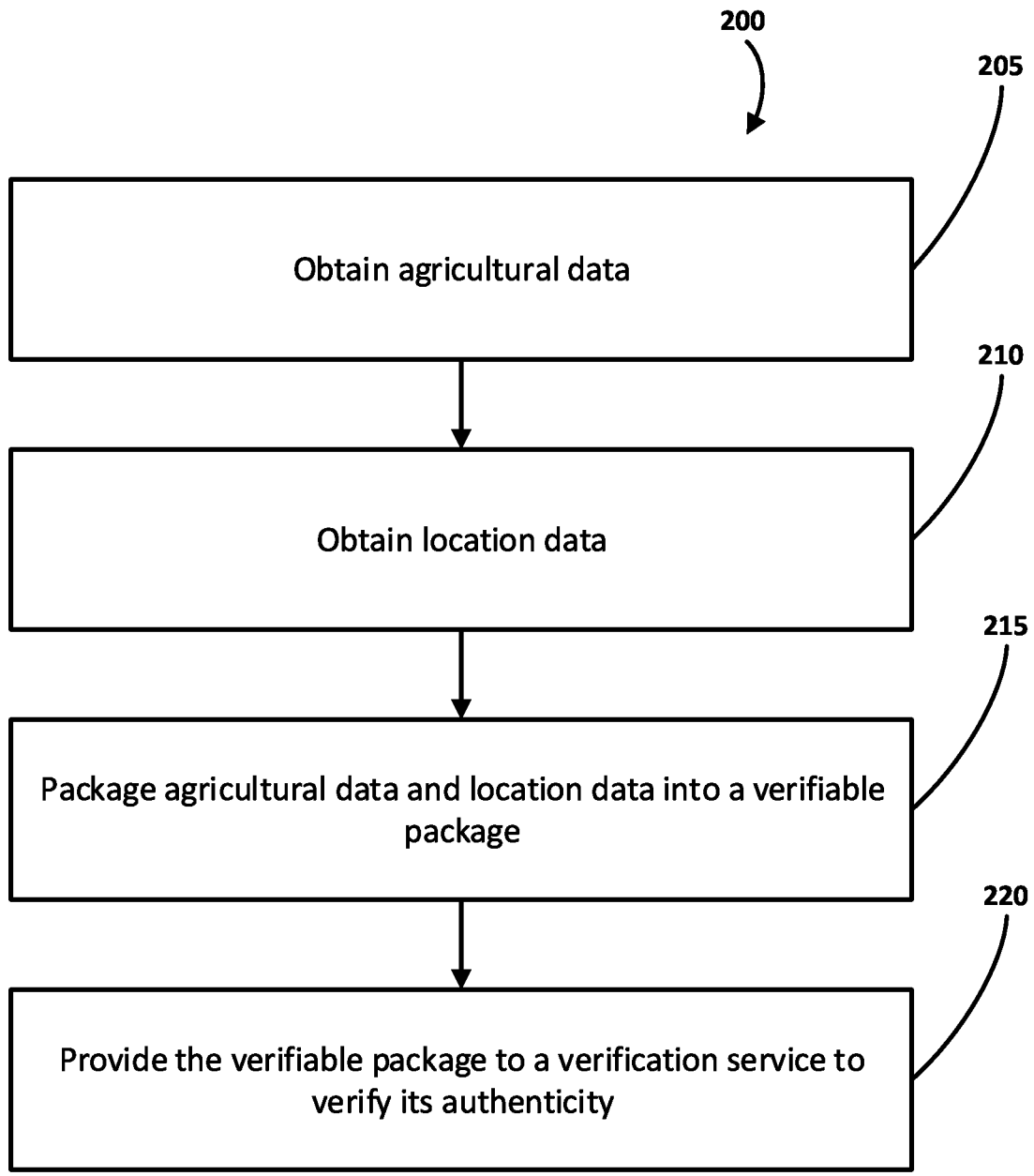
FIG. 2 depicts a flowchart illustrating an example method according to various implementations disclosed herein.

FIG. 2 depicts a flowchart illustrating an example method 200 of combining responses of multiple automated assistants to cause one or more actions to be performed. For convenience, the operations of the method 200 are described with reference to a system that performs the operations. This system of method 200 includes one or more processors and/or other component(s) of a client device. Moreover, while operations of the method 200 are shown in a particular order, this is not meant to be limiting. One or more operations may be reordered, omitted, or added.

At step 205, agricultural data is retrieved that demonstrates that an agricultural field is in compliance with one or more agricultural stewardship criteria. The agricultural data can include images that are captured by vision sensor 101, which can be attached to agricultural equipment and carried through a field. In some implementations, the agricultural data can include image data that is captured periodically and/or image data that is pre-filtered such that the data includes only images that depict the stewardship criteria.

In some implementations, the agricultural data includes images of the field where the vision sensor 101 was located. In some implementations, the agricultural data can include the output of one or more machine learning models. For example, a machine learning model can be trained to generate inferences that can be compared to, or directly indicate compliance/noncompliance with, one or more stewardship criteria (e.g., tillage practices, ground cover) or crop conditions (e.g., crop damage). In some implementations, the agricultural data can include both output from a machine learning model as well as one or more images. For example, a given image can be included in the agricultural data in instances where a machine learning model outputs a likelihood above a certain threshold that the criteria is met (or not met) by the image.

At step 210, location data is obtained that corresponds to the location of the field where the images were captured. The location data can be generated by one or more sensors that are located in proximity to the vision sensor 101. For example, the one or more location sensors can include a GPS component that, as images are captured, determines the location where the images were captured. Thus, for images that are captured, a verifiable location of where the images were captured can be ascertained.

At step 215, the location data and the agricultural data (e.g., image data or machine learning model output) is packaged into a verifiable package. Generating the verifiable package can include, for example, packaging the image and location data with authentication data, such as a hash of the data and/or a blockchain of the data, such that the veracity of the data can be determined. In some implementations, the authentication data that is included in the verifiable package can include an encryption of the data utilizing one or more public keys such that the possessor of the corresponding private key can decrypt the data.

At step 220, the verifiable package is provided to a verification service to verify the authenticity of the agricultural data based on the authentication data. For example, the client computing device 105 can provide, via one or more communication protocols, the verifiable package to verification computing device 110. Decoder 130 can then determine, based on the authentication data, whether the agricultural data is accurate, complete, and/or has not been altered. This can include, for example, utilizing a provided hash to verify that the data that was provided is the same as the data that was generated, decrypting the data utilizing a private key, and/or other process that can otherwise be utilized to verify that the data that was captured by the vision sensor 101 (and/or the machine learning model output that was generated based on the images) is authentic.

Figure 3:
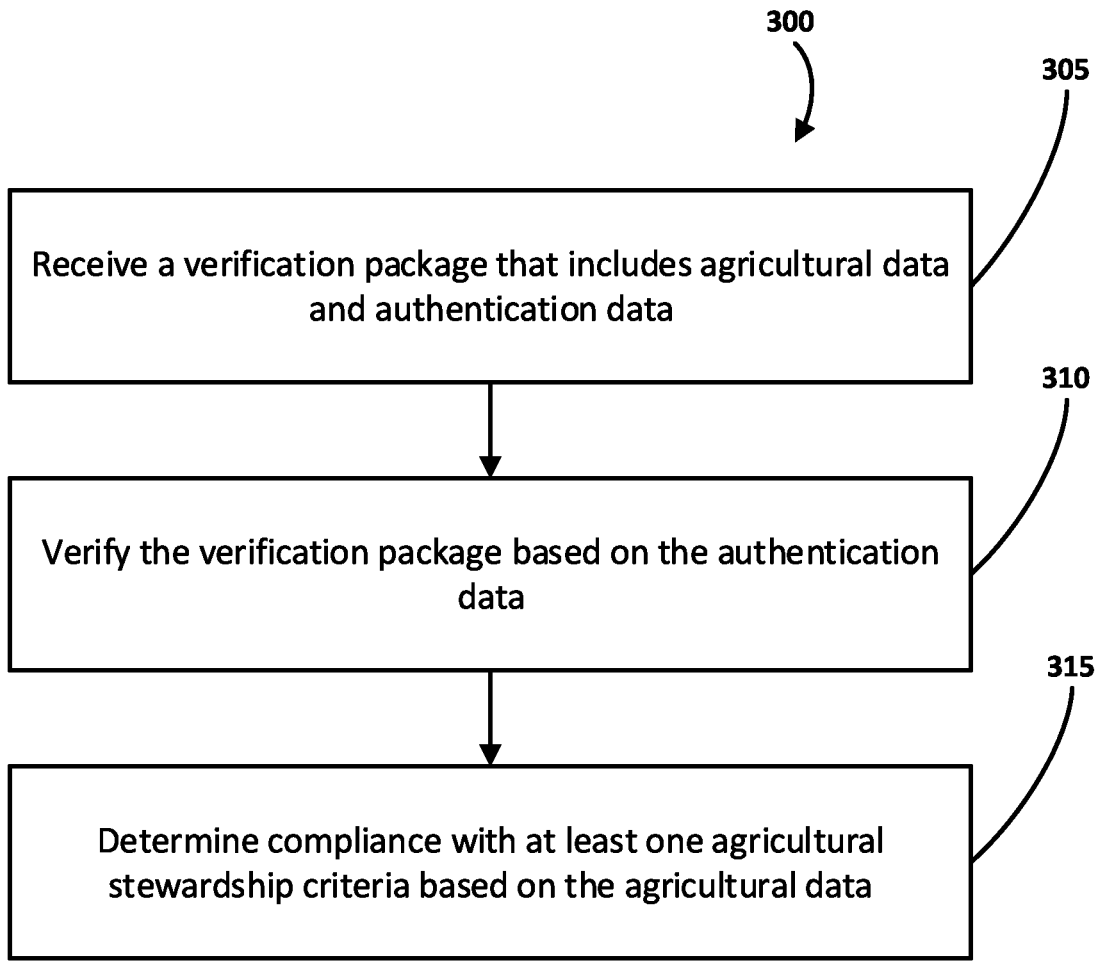
FIG. 3 depicts a flowchart illustrating another example method according to various implementations disclosed herein.

FIG. 3 depicts a flowchart illustrating an example method 300 of combining responses of multiple automated assistants to cause one or more actions to be performed. For convenience, the operations of the method 300 are described with reference to a system that performs the operations. This system of method 300 includes one or more processors and/or other component(s) of a client device. Moreover, while operations of the method 300 are shown in a particular order, this is not meant to be limiting. One or more operations may be reordered, omitted, or added.

At step 305, a verification package is received by a verification service. As previously described, the verification package can include agricultural data (e.g., image data and/or machine learning model output), location data indicative of a location where the agricultural data was generated, and authentication data that was generated based on the agricultural data and the location data. For example, the verification package can include a hash of the agricultural data and location data, an encryption of the data, and/or a blockchain of the data.

At step 310, the agricultural data is verified based on the authentication data. Verification can include utilizing the authentication data to determine whether the agricultural data has been altered, amended, and/or tampered with in any manner. In some implementations, the authentication data can be a hash, and verification of the agricultural data can include verifying that the hash corresponds to the agricultural and location data that is provided. In some implementations, verification can include decrypting the verification package utilizing a private key that is possessed only by the verification service.

At step 315, in response to verifying that the agricultural data is authentic, compliance with at least one agricultural stewardship criteria can be determined. In some implementations, one or more machine learning models can be utilized to determine one or more inferences from the agricultural data that indicate compliance (or non-compliance) with a stewardship criteria, such as ground cover, tillage practices, use of organic farming practices, and/or other criteria that can be inferred from images.

Figure 4:
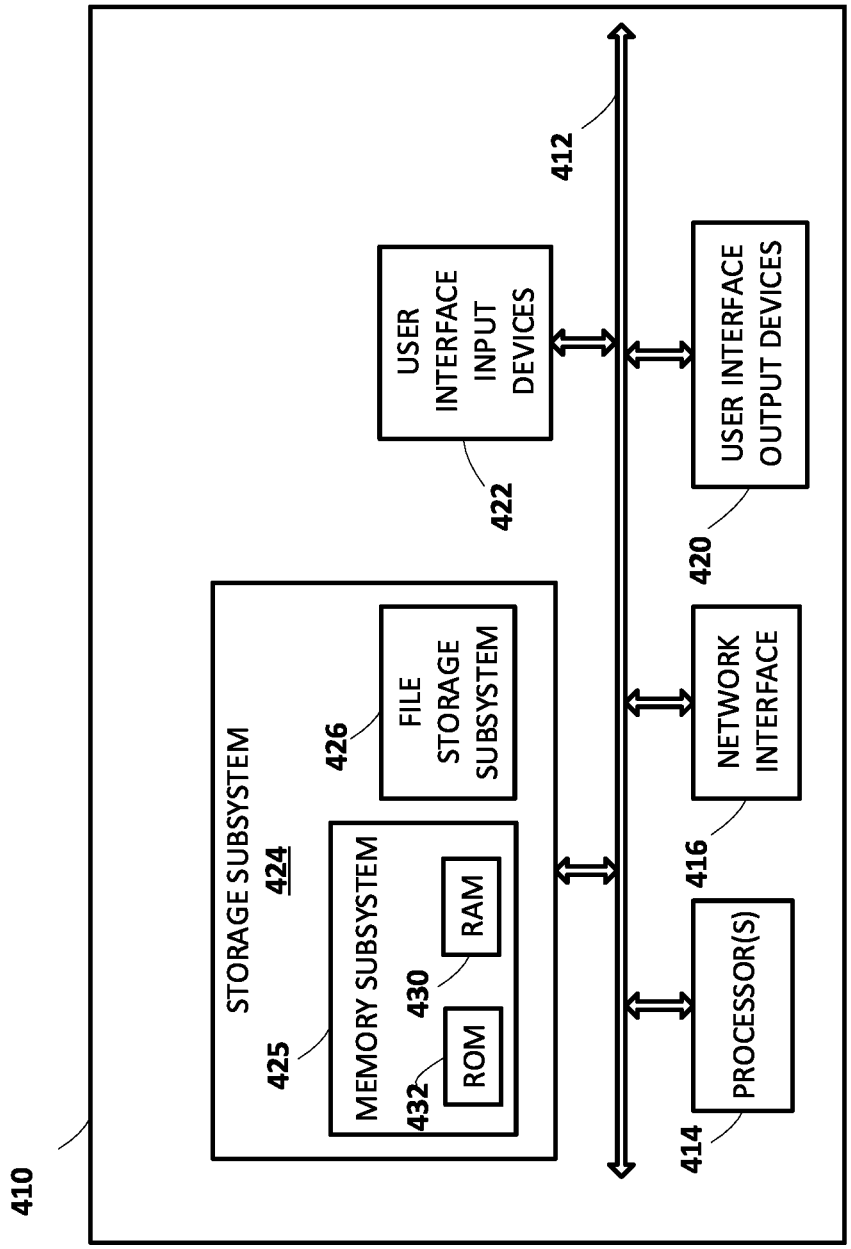
FIG. 4 illustrates an example architecture of a computing device.

FIG. 4 is a block diagram of an example computing device 410 that may optionally be utilized to perform one or more aspects of techniques described herein. Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods of FIG. 2 and FIG. 3, and/or to implement various components depicted in FIG. 1.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
obtaining agricultural data demonstrating whether an agricultural field is in compliance with an agricultural stewardship criterion, wherein the agricultural data includes vision sensor data generated by one or more vision sensors carried through the agricultural field by agricultural equipment;
obtaining location data for the agricultural field, wherein the location data is generated at least in part by one or more additional sensors carried through the agricultural field by the agricultural equipment;
receiving a machine learning model from a verification service, the machine learning model trained to generate an inference based on the vision sensor data;
packaging the location data, the vision sensor data, the agricultural data, and the inference with authentication data to generate a verifiable package; and
providing the verifiable package to the verification service, wherein the verification service verifies authenticity of the agricultural data based on the authentication data.

2. The method of claim 1, wherein the authentication data includes a hash computed based on the agricultural data or the location data.

3. The method of claim 1, wherein the machine learning model is encoded in the verifiable package.

4. The method of claim 3, wherein the authentication data includes a hash computed based at least in part on the machine learning model or the inference of the machine learning model.

5. The method of claim 1, wherein the inference includes an amount or type of ground cover detected in the agricultural field.

6. The method of claim 3, wherein the inference includes a detected tillage practice.

7. The method of claim 3, wherein the inference includes detected crop damage.

8. The method of claim 1, wherein the packaging includes encrypting the location data, the vision sensor data, the agricultural data, and the inference using a public key, wherein the verification service verifies the authenticity of the agricultural data by decrypting the location data, the vision sensor data, the agricultural data, and the inference using a private key.

9. The method of claim 1, wherein the authentication data includes a blockchain generated based on the agricultural data or the location data.

10. A system comprising one or more processors and memory storing instructions that, in response to execution of the instructions by the one or more processors, cause the one or more processors to perform the following operations:

obtaining agricultural data demonstrating whether an agricultural field is in compliance with an agricultural stewardship criterion, wherein the agricultural data includes vision sensor data generated by one or more vision sensors carried through the agricultural field by agricultural equipment;

obtaining location data for the agricultural field, wherein the location data is generated at least in part by one or more additional sensors carried through the agricultural field by the agricultural equipment;

receiving a machine learning model from a verification service, the machine learning model trained to generate an inference based on the vision sensor data;

packaging the location data, the vision sensor data, the agricultural data, and the inference with authentication data to generate a verifiable package; and providing the verifiable package to the verification service, wherein the verification service verifies authenticity of the agricultural data based on the authentication data.

11. The system of claim 10, wherein the authentication data includes a hash computed based on the agricultural data or the location data.

12. The system of claim 10, wherein the machine learning model is encoded in the verifiable package as a hash for transmission to the verification service.

13. The system of claim 10, wherein the authentication data includes a blockchain generated based on the agricultural data or the location data.

* * * * *